United States Patent [19]
Dermiah et al.

[11] 3,721,258
[45] March 20, 1973

[54] APPARATUS FOR SUPPLYING COOLANT LIQUID FOR REFRIGERATION COILS

[76] Inventors: John F. Dermiah, 2221 S. Glenmorrie Drive, Lake Oswego; Delmar L. Montgomery, 4323 N. E. 66th Avenue, Portland, both of Oreg.

[22] Filed: Dec. 28, 1970

[21] Appl. No.: 101,610

[52] U.S. Cl. .........137/111, 137/101.25, 137/101.27
[51] Int. Cl. ..............................................G05d 11/00
[58] Field of Search......137/93, 101.25, 101.27, 111, 137/409

[56] References Cited

UNITED STATES PATENTS

| | | | |
|---|---|---|---|
| 3,376,883 | 4/1968 | Douty et al. | 137/93 |
| 3,094,133 | 6/1963 | Treaner | 137/101.25 |
| 3,361,150 | 1/1968 | Horner | 137/93 |
| 3,592,212 | 7/1971 | Schleimer | 137/93 |
| 2,772,779 | 12/1956 | Norris | 137/93 |
| 2,787,281 | 4/1957 | Ward | 137/93 |
| 2,979,066 | 4/1961 | Christie | 137/93 |

*Primary Examiner*—Martin P. Schwadron
*Assistant Examiner*—A. M. Zupic
*Attorney*—Oliver D. Olson

[57] ABSTRACT

A concentrated aqueous solution of corrosion inhibiting chemical is metered from a container through an electrically operated metering pump and chemical supply line to the sump of a cooling tower for mixing with cooling water contained in the sump. Pump operation is controlled by an electric switch which is operated by a float in the sump. The electric switch also controls operation of a solenoid valve in a make-up water supply line to the sump, which line is independent of the chemical supply line. A second electrically operated metering pump may be controlled by the switch to meter acid from a receptacle to the sump to maintain the pH of the coolant liquid at a desired level.

1 Claim, 1 Drawing Figure

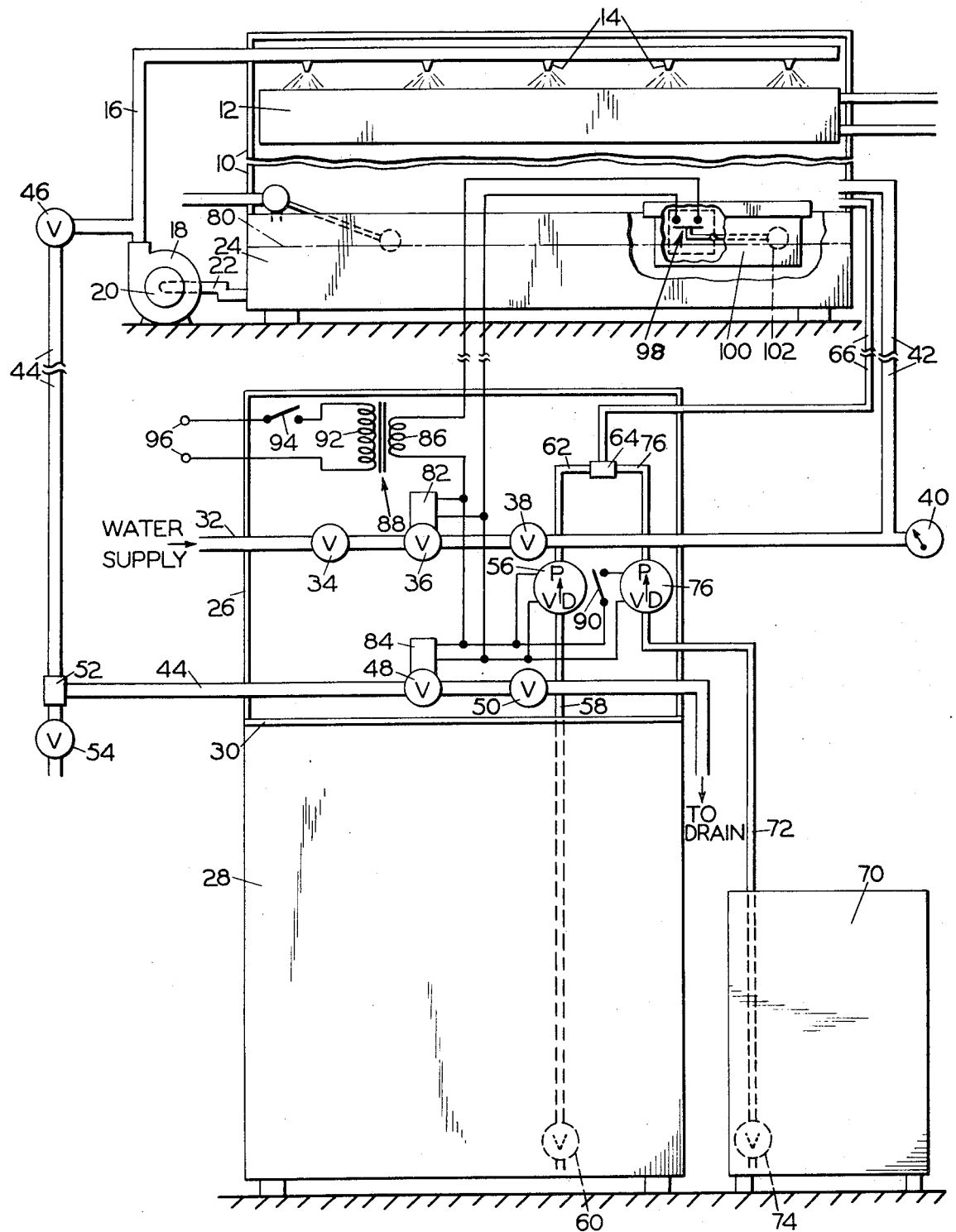

APPARATUS FOR SUPPLYING COOLANT LIQUID FOR REFRIGERATION COILS

BACKGROUND OF THE INVENTION

This invention relates to refrigeration equipment, and more particularly to simplified apparatus for supplying chemically treated coolant water for refrigeration equipment.

In the use of refrigeration equipment, such as is employed in super-markets, etc., the coolant water for the refrigeration equipment is passed through a cooling tower to reduce the temperature of the water which, in turn, reduces the temperature of the refrigerant. In the closed system a closed circuit of cooling water is circulated through cooling coils in the tower and the coils are cooled by a spray of coolant water. In the open system coolant water is circulated through the compressors and over louvers in the tower. In both systems coolant is returned to a sump from whence it is recirculated through the system.

In order to inhibit the formation of scale and other forms of corrosion on the water coolant system, the coolant liquid generally includes a predetermined concentration of corrosion inhibiting chemicals, such as alkali metal chromates and various others well known in the art. Inasmuch as some of the content of the chemical inhibitors is utilized in the process and some of the coolant water is evaporated, means must be provided for making up the losses of chemical and coolant water continually in order to maintain proper concentration of the inhibiting solution.

Apparatus provided heretofore for the purpose of maintaining proper concentration of inhibiting solution, are characterized by several disadvantages. Most are quite complex, bulky and expensive. In one type of prior apparatus a concentrated solution of corrosion inhibiting chemical is metered directly into the make-up water supply line by means of an aspirator. This arrangement does not provide sufficiently accurate and consistent metering of chemical solution, particularly at low rates. The aspirator orifice becomes plugged easily and thus requires frequent maintenance. Moreover, the aspirator system cannot be employed with refrigeration systems wherein the tower sump is located above the elevation of the aspirator, because of the hazard presented by the possibility of the chemical solution being drawn back into the main water supply line due to a condition, such as a sudden drop in water pressure, which produces a negative pressure at the aspirator.

SUMMARY OF THE INVENTION

In its basic concept the apparatus of this invention involves the metering of corrosion inhibiting solution and the delivery of make-up coolant water to the sump of a cooling tower independently of each other but in response to variations in level of coolant liquid in the tower sump.

It is by virtue of the foregoing basic concept that the principal objective of this invention is achieved; namely, to overcome the aforementioned disadvantages of prior apparatus.

Another important object of this invention is the provision of apparatus of the class described which includes means also responsive to variations in level of coolant liquid in the tower sump to meter acid to the sump to maintain the pH of the coolant liquid at a desired level.

The foregoing and other objects and advantages of this invention will appear from the following detailed description taken in connection with the accompanying drawing of a preferred embodiment.

BRIEF DESCRIPTION OF THE DRAWING

The single view is a foreshortened front elevation in somewhat schematic form showing associated with a conventional refrigeration coil cooling tower, coolant liquid supplying apparatus embodying the features of this invention.

DESCRIPTION OF THE PREFERRED EMBODIMENT

For purposes of illustration the drawing shows a form of conventional cooling tower which includes an open housing 10 in which is contained a portion of a closed system water cooling coil 12 to be cooled. This portion of the coil is disposed below a plurality of coolant liquid spray nozzles 14 which communicate with a feed pipe 16 connected to the outlet side of a rotary liquid pump 18 driven by an electric motor 20. The pump inlet communicates through a pipe 22 with a sump 24 provided at the bottom of the cooling tower housing. The sump functions to collect the coolant liquid which falls by gravity from the coil 12. The collected liquid is pumped to the spray nozzles under pressure from whence it is sprayed upon the coils 12 to cool the water therein.

Coolant liquid is supplied to the sump of the cooling tower by apparatus of this invention now to be described. A housing 26 forms at its lower end a container 28 for a supply of concentrated aqueous solution of corrosion inhibiting material which is introduced into the container by opening a hinged cover 30.

A water supply pipe 32, adapted for connection at one end to a source of water under pressure, extends through the housing 26 above the cover 30. A manually operable regulator valve 34 in the housing is interposed in this pipe for regulating the water pressure. Downstream from the regulator valve there is interposed in the pipe an electrically actuated solenoid shut-off valve 36. Downstream from this shut-off valve there is interposed in the pipe a manually operable control valve 38 for regulating the volume of water. A T-fitting at the end of the pipe connects the latter to a pressure gauge 40 and to a water make-up feed pipe 42 which extends through the tower housing 10 and terminates above the sump 24.

A bleed pipe 44 is connected to one end through a manual shut-off valve 46 and T-fitting to the feed pipe 16. This bleed pipe extends through the housing 26 wherein are interposed an electrically actuated solenoid shut-off valve 48 and a manually adjustable flow regulating valve 50. The outer end of the bleed pipe leads to a drain.

Interposed in the bleed pipe upstream from the shut-off valve 48 is a T-fitting 52 to which is connected a manually operable tap 54. This tap provides means for obtaining periodic samples of the solution in the sump for chemical control analysis, as will be understood.

Means is provided for metering the concentrated solution of corrosion inhibiting material in the container 28 to the sump 24 independent of the make-up water. To this end a positive displacement metering pump 56, preferably of the variable displacement type, is mounted in the housing 26 above the cover 30, and its inlet is connected to the upper end of an infeed pipe 58. The lower end of the pipe communicates through a foot valve 60 with the interior of the container 28 adjacent the bottom thereof. The outlet of the pump communicates through a pipe 62 and Y-fitting 64 with a chemical feed pipe 66 which extends through the tower housing 10 and terminates above the sump 24.

The pump is driven electrically, as illustrated, as by an integral electric motor. It is of the low volume type which affords accurate metering of sufficiently low volumes of the concentrated chemical solution to provide the coolant liquid in the sump with corrosion inhibiting chemical in proportion of about 300 to about 400 parts per million.

Means also preferably is provided for maintaining the coolant liquid at a desired level of pH to prevent the growth of algae and formation of carbonate scale. Thus, in those areas where the water supply is alkaline and accordingly amenable to algae growth and scale formation, it is necessary to add sufficient acid to reduce the pH to between 6 and 7.

For this purpose a receptacle 70 is provided for a supply of suitable acid, such as sulfuric acid but preferably sulfamic acid. A feed pipe 72 provided with a foot valve 74 adjacent the bottom of the receptacle is connected at the opposite end to the inlet of a second metering pump 76 which preferably is of the same type as pump 56. The outlet of the pump 76 is connected through the pipe 78 and Y-fitting 64 to the chemical feed pipe 66.

Operation of the solenoid valves and metering pumps is controlled by variations in level 80 of solution in the sump 24, in order to maintain automatically a substantially constant volume and concentration of chemically treated coolant liquid for the cooling tower. In the embodiment illustrated, the coils 82 and 84 of the solenoid valves 36 and 48, respectively, and the electric drive motors for the pumps 56 and 76, are connected in parallel across the low voltage secondary winding 86 of a stepdown transformer 88. The electric circuit of pump 76 preferably includes a switch 90 to control its operation, since it may not need to be used at all times. The primary winding 92 of the transformer is adapted for connection through a main control switch 94 to a conventional source 96 of electric power. For example, the primary winding may be connected to a standard supply of 110 volts, with the secondary winding providing 24 volts output The coils and pump motors are connected across the secondary winding 86 through an electric switch 98 of a conventional float switch mechanism contained in a bottomless housing 100 mounted on a side wall of the sump 24. The switch preferably is of the mercury type. The float component 102 is arranged to be responsive to changes in level 80 of coolant liquid in the sump.

In the operation of the apparatus described hereinbefore, the container 28 is filled with a quantity of an aqueous solution of corrosion inhibiting material, either as a saturated solution, or as a solution providing a predetermined concentration substantially greater than the concentration desired for the ultimate cooling liquid.

Assuming that the sump 24 contains no liquid, the float element 102 of the float switch mechanism is depressed, effecting closure of the switch 98 and consequent energization of the solenoid coils 82 and 84 and drive motor for the pump 56 (assuming switch 90 is open). The valves 36 and 48 thus are opened and the pump 56 is activated. However, it will be understood that the drive motor 20 for the coolant pump 18 is deenergized in order to prevent damage to the pump. Accordingly, no liquid is being discharged through the bleed pipe 44.

Water under pressure from the supply passes through the pipe 32 to the sump. The valves 34 and 38 may be adjusted to provide the desired pressure and volume of water fed to the sump.

Simultaneously, activation of the pump 56 effects metering of concentrated solution from the container 28 through the feed pipe 66 to the sump.

When the sump becomes filled with solution the electric motor 20 for the pump 18 is energized, whereupon the coolant liquid is delivered to the spray nozzles 14 from whence it is sprayed over the cooling coils 12 and then is returned by gravity to the sump.

Periodically, the tap 54 may be opened to collect a sample of coolant liquid for chemical analysis. The variable displacement pump 56 may be adjusted to increase or decrease the metering of solution from the container 28 to provide the proper concentration of corrosion inhibiting material in the coolant liquid.

When the diluted aqueous solution reaches a predetermined level 80 in the sump 24, the float 102 is elevated to open the switch 100 and thus deenergize the solenoid coils and the drive motor for the pump.

A portion of the corrosion inhibiting chemicals react chemically to inhibit the formation of scale and other corrosion on the coolant system and a portion of the water is evaporated by the heat extracted therefrom. Accordingly, the coolant liquid returning by gravity from the cooling coils to the sump progressively diminishes both in volume and in chemical content. Generally, loss of water by evaporation exceeds the loss of chemical content, whereupon the coolant liquid collected in the sump progressively increases in chemical concentration.

As the level of solution in the sump diminishes from the predetermined level 80, the float element 102 lowers, closing the switch 100 and activating the solenoid coils and drive motor for the pump 56. With the opening of the valve 36 additional make-up water is supplied to the sump, while activation of the pump 56 supplies additional corrosion inhibitor solution to the sump.

Simultaneously therewith, a portion of the more concentrated solution in the sump 24 is discharged under pressure of the pump 18 through the bleed pipe 44 and valves 48 and 50 to the drain. By proper adjustment of the manual valve 50 the amount of solution thus bled off from the contents of the sump may be adjusted to accommodate the required volume of make-up to restore the level and bring the total volume of solution down to proper concentration.

Periodic chemical analysis of the coolant liquid in the sump may be made from a sample collected at the tap 54 to correct for periodic variations in chemical content of the water supply and in the ambient temperature of the cooling tower. Corresponding adjustments thus may be made in the settings of the adjustable valves and metering pump to assure maintenance of the desired predetermined volume and concentration of the coolant liquid.

In the event the pH of the coolant liquid rises above about 7, the electric switch 90 may be closed to energize the electric drive motor for the second metering pump 76 to supply acid from the receptacle 70 to the sump, as will be understood.

From the foregoing it will be appreciated that the present invention provides apparatus of the class described which is of extremely simplified construction. It is substantially self-contained for easy portability and installation in minimum space adjacent conventional refrigeration coil cooling towers. It provides accurate metering of low volumes of chemical additives to the coolant liquid. It may be utilized with cooling towers in which the sump is located at a higher elevation than the apparatus, without danger of backfeed of chemical into the water supply.

It will be apparent to those skilled the art that various changes may be made in the size, shape, number, type and arrangement of parts described hereinbefore without departing from the spirit of this invention.

Having now described our invention and the manner in which it may be used, we claim:

1. Apparatus for maintaining a predetermined volume and concentration of an aqueous coolant liquid solution of corrosion inhibiting material in the sump of a refrigeration coil cooling tower wherein the latter includes coolant liquid delivery means supplied with coolant liquid from the sump through a motor driven coolant pump and the coolant liquid is returned from the delivery means to the sump, the apparatus comprising:

a. a container for a supply of concentrated solution of corrosion inhibiting material,
b. water supply conduit means adapted for connection at one end to a source of water under pressure and at the opposite end for communication with the sump,
c. electrically operated metering pump means having an inlet communicating with the container and an outlet adapted for communication with the sump,
d. a receptacle for a supply of acid solution,
e. electrically operated acid metering with a receptacle and an outlet adapted for communication with the sump,
f. shut-off valve means in the water supply conduit means,
g. electrical actuator means for the valve means,
h. bleed conduit means adapted for connection to the outlet of the coolant pump for bleeding off a portion of coolant liquid in the sump,
i. bleed valve means in the bleed conduit means,
j. electrical actuator means for the bleed valve means,
k. an electrical circuit including the electrically operated metering pump means, the electrically operated acid metering pump means, the electrical actuator for the shut-off valve means and the electrical actuator for the bleed valve means,
l. switch means in the electric circuit, and
m. float means adapted for mounting in the sump and operatively engaging the switch means for operating the latter at a predetermined level of liquid in the sump.

* * * * *